(12) United States Patent
Yong et al.

(10) Patent No.: US 10,483,501 B2
(45) Date of Patent: Nov. 19, 2019

(54) SECONDARY BATTERY

(71) Applicant: SAMSUNG SDI CO., LTD., Yongin-si, Gyeonggi-do (KR)

(72) Inventors: Junsun Yong, Yongin-si (KR); Jongha Lee, Yongin-si (KR); Sangjin Lee, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 345 days.

(21) Appl. No.: 14/824,259

(22) Filed: Aug. 12, 2015

(65) Prior Publication Data

US 2016/0049619 A1 Feb. 18, 2016

(30) Foreign Application Priority Data

Aug. 13, 2014 (KR) .......................... 10-2014-0104863

(51) Int. Cl.
*H01M 2/02* (2006.01)

(52) U.S. Cl.
CPC ................................. *H01M 2/0217* (2013.01)

(58) Field of Classification Search
CPC .................................................. H01M 2/0217
See application file for complete search history.

(56) References Cited

U.S. PATENT DOCUMENTS

| 2003/0003355 A1* | 1/2003 | Ueda ................... H01M 2/0202 |
| | | 429/176 |
| 2010/0248015 A1 | 9/2010 | Cha |
| 2011/0123854 A1 | 5/2011 | Kim |
| 2013/0029208 A1* | 1/2013 | Seong ................. H01M 2/0217 |
| | | 429/163 |

FOREIGN PATENT DOCUMENTS

| JP | 10-321198 A | 12/1998 |
| JP | 2007-323845 A | 12/2007 |
| KR | 10-1101093 B1 | 1/2012 |
| KR | 10-1136297 B1 | 4/2012 |

* cited by examiner

*Primary Examiner* — Cynthia K Walls
(74) *Attorney, Agent, or Firm* — Lee & Morse, P.C.

(57) ABSTRACT

A secondary battery includes an electrode assembly, a can housing the electrode assembly, the can having a long axis and a short axis, and a cap plate that seals an opening of the can. The can includes a first side surface and a second side surface that face each other so as to correspond to the short axis of the can, the first side surface and the second side surface having a first thickness, a third side surface and a fourth side surface that face each other so as to correspond to the long axis of the can, the third side surface and the fourth side surface having a second thickness, the second thickness being greater than the first thickness, and a bottom surface that is located opposite the opening of the can and contacts the first through fourth side surfaces, the bottom surface having a third thickness.

9 Claims, 5 Drawing Sheets

SECONDARY BATTERY

CROSS-REFERENCE TO RELATED APPLICATION

Korean Patent Application No. 10-2014-0104863, filed on Aug. 13, 2014, in the Korean Intellectual Property Office, and entitled: "Secondary Battery," is incorporated by reference herein in its entirety.

BACKGROUND

1. Field

One or more embodiments relate to a secondary battery.

2. Description of the Related Art

Unlike primary batteries that cannot be charged, secondary batteries can be charged and discharged. Thus, secondary batteries are widely used in many advanced small electronic devices in various fields.

SUMMARY

Embodiments are directed to a secondary battery including an electrode assembly including a first electrode plate, a second electrode plate, and a separator between the first electrode plate and the second electrode plate, a can housing the electrode assembly, the can having a long axis and a short axis, and an opening at a side thereof through which the electrode assembly is inserted, and a cap plate that seals the opening of the can. The can includes a first side surface and a second side surface that face each other and extend in a direction of the short axis of the can, the first side surface and the second side surface each having a first thickness, a third side surface and a fourth side surface that face each other and extend along a direction of the long axis of the can, the third side surface and the fourth side surface each having a second thickness, the first thickness being greater than the second thickness, and a bottom surface that is located opposite the opening of the can and contacts the first through fourth side surfaces, the bottom surface having a third thickness.

The can may further include a first connection part where the first side surface or the second side surface is connected to the third side surface and the fourth side surface. A thickness of the first connection part may increase or decrease in a continuous manner.

The thickness of the first connection part may decrease from the first thickness to the second thickness in a direction from the first side surface or the second side surface toward the third side surface or the fourth side surface.

Each of the first side surface and the second side surface may have a semicircle shape having a predetermined curvature radius.

The third thickness of the bottom surface may be greater than either of the first thickness and the second thickness.

The can may include a second connection part where the bottom surface is connected to the first side surface and the second side surface, and a third connection part where the bottom surface is connected to the third side surface and the fourth side surface. A thickness of the second connection part and a thickness of the third connection part may increase or decrease in a continuous manner.

The thickness of the second connection part may decrease from the third thickness to the first thickness in a direction from the bottom surface toward the first side surface and the second side surface.

The thickness of the third connection part may decrease from the third thickness to the second thickness in a direction from the bottom surface toward the third side surface and the fourth side surface.

Corners formed at contact points between the bottom surface and the first through fourth side surfaces may be rounded. An inner curvature and an outer curvature of each of the corners may be equal to each other.

The first thickness may be about 0.38±0.1 mm, the second thickness may be about 0.25±0.1 mm, and the third thickness is about 0.55±0.1 mm.

Embodiments are also directed to a can for a secondary battery including a first side surface and a second side surface that face each other and extend along a short axis, the first side surface and the second side having a first thickness, a third side surface and a fourth side surface that face each other and extend along a long axis, the third side surface and the fourth side surface having a second thickness, a bottom surface that has a third thickness, the bottom surface contacting the first through fourth side surfaces, and a first connection part where the first side surface or the second side surface is connected to the third side surface and the fourth side surface. The third thickness is greatest, the second thickness is smallest, and a thickness of the first connection part decreases in a continuous manner from the bottom surface to the first through fourth side surfaces.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
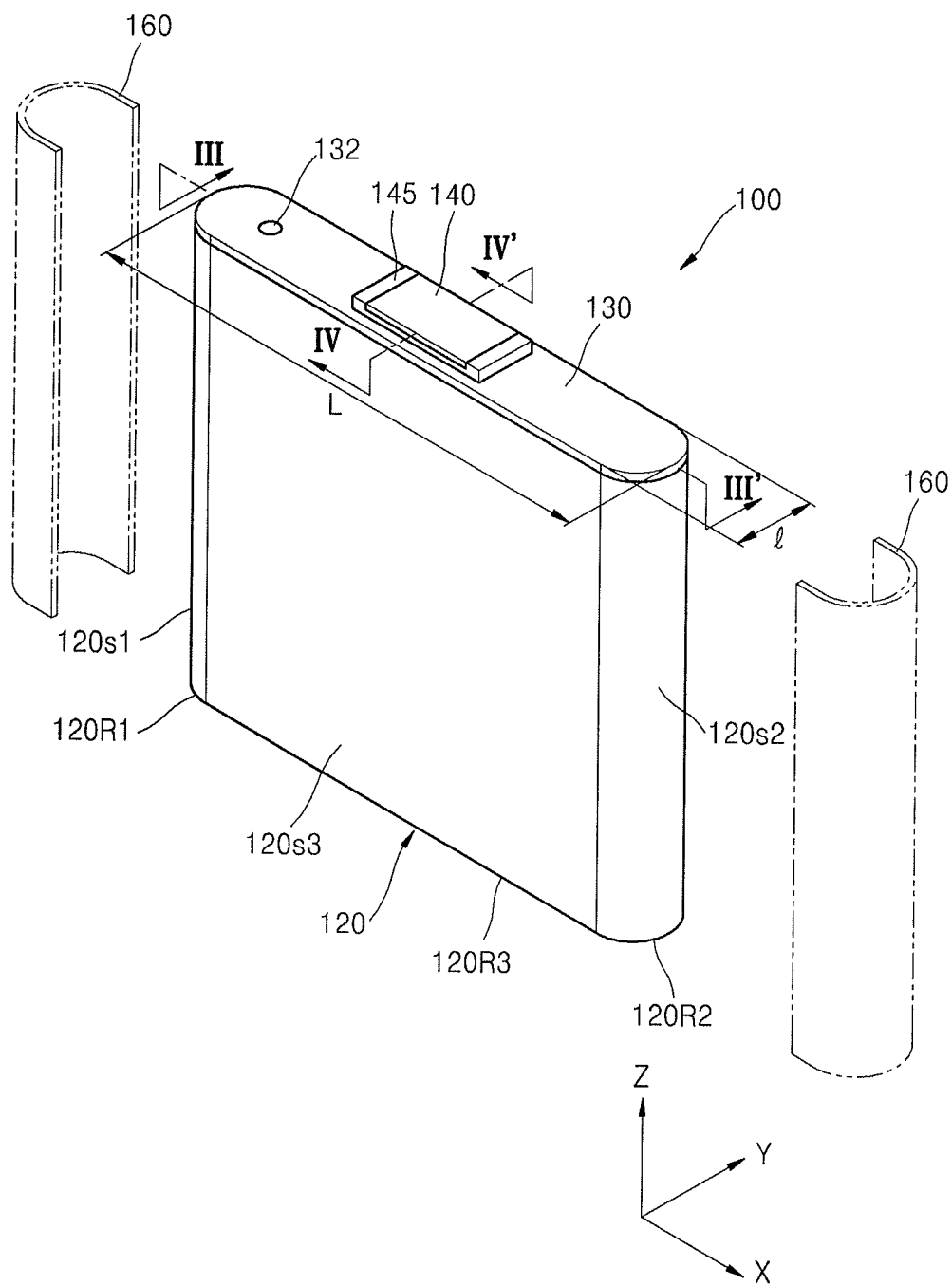
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Throughout the specification, while such terms as "first," "second," etc., may be used to describe various components, such components must not be limited to the above terms. The above terms are used only to distinguish one component from another.

Throughout the specification, a singular form may include plural forms, unless there is a particular description contrary thereto.

Hereinafter, in one or more embodiments, X-axis, Y-axis, and Z-axis may not be limited to three axes on a rectangular coordinate system but may be interpreted as a broad meaning including the three axes. For example, the X-axis, Y-axis, and Z-axis may be perpendicular to each other or may indicate different directions that are not perpendicular to each other.

Figure 2:
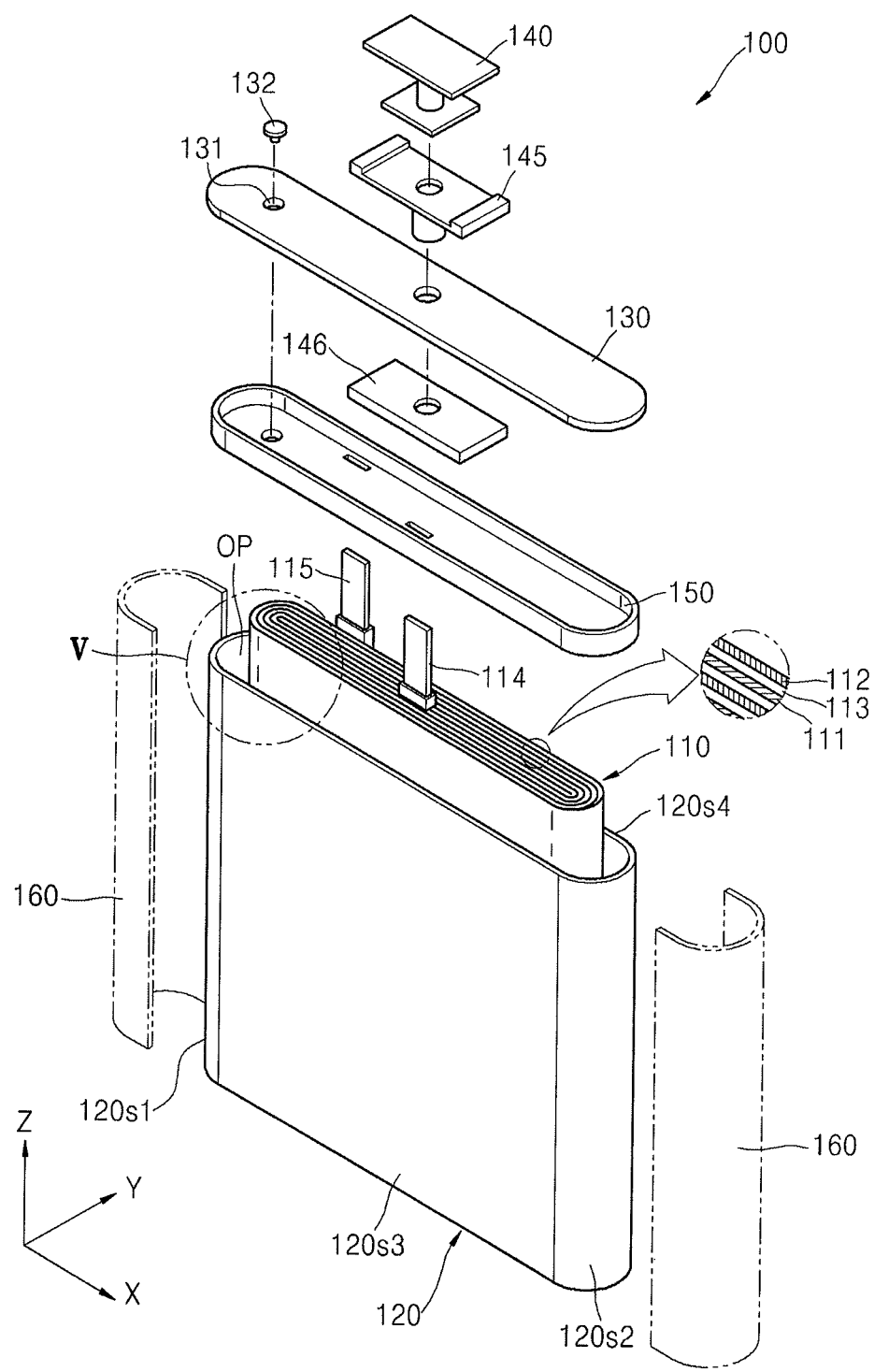
FIG. 2 illustrates an exploded perspective view of the secondary battery of FIG. 1.
Figure 3:
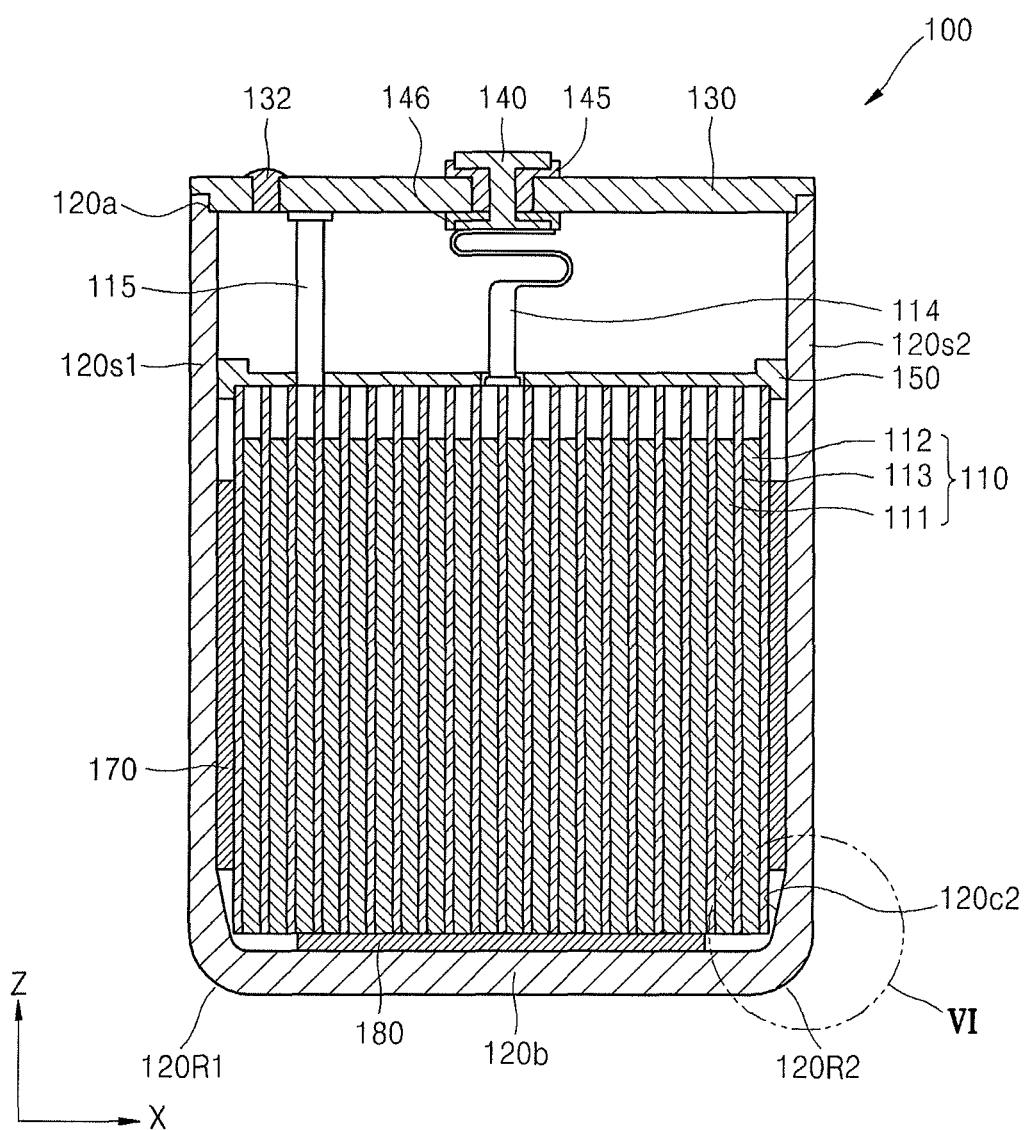
FIG. 3 illustrates a cross-sectional view of the secondary battery of FIG. 1, taken along a line IV-IV' of FIG. 1.
Figure 4:
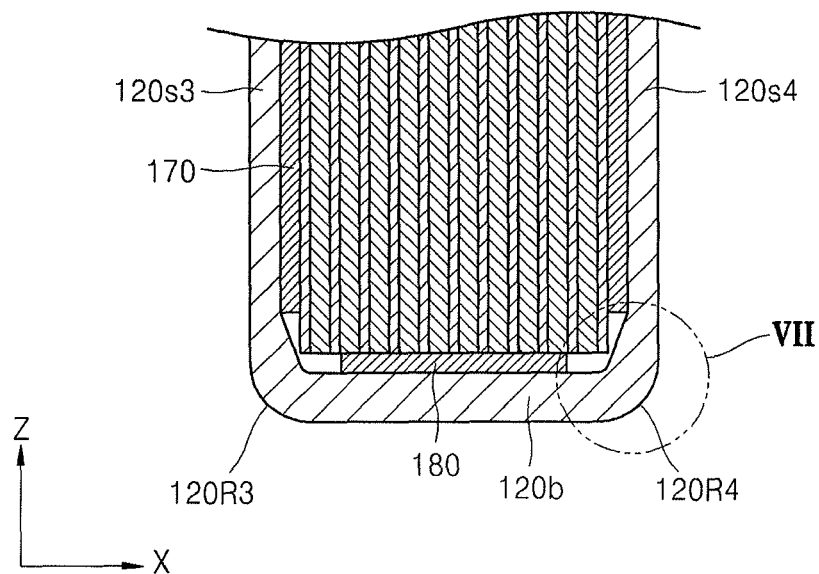
FIG. 4 illustrates a cross-sectional view illustrating a lower portion of the secondary battery of FIG. 1, taken along a line V-V' of FIG. 1.

FIG. 1 illustrates a perspective view of a secondary battery 100 according to an embodiment. FIG. 2 illustrates an exploded perspective view of the secondary battery 100. FIG. 3 illustrates a cross-sectional view of the secondary battery 100, taken along a line IV-IV' of FIG. 1. FIG. 4 illustrates a cross-sectional view illustrating a lower portion of the secondary battery 100, taken along a line V-V' of FIG. 1.

Referring to FIGS. 1 through 4, the secondary battery 100 may include an electrode assembly 110, a can 120 that houses the electrode assembly 110, and a cap plate 130 that seals the can 120.

The electrode assembly 110 may include a first electrode plate 111 and a second electrode plate 112 that are coated with an electrode active material, and a separator 113 that is interposed between the first electrode plate 111 and the second electrode plate 112. The electrode assembly 110 may be formed by sequentially stacking the first electrode plate 111, the separator 113, and the second electrode plate 112 and rolling them a jelly roll shape. The electrode plate 111 and the second electrode plate 112 are respectively electrically connected to a first electrode tab 114 and a second electrode tab 115 that are arranged to externally discharge charges that are generated by a chemical reaction the secondary battery 100. The first electrode tab 114 and the second electrode tab 115 may extend in the same direction. For example, the first and second electrode tabs 114 and 115 may extend toward an opening OP of the can 120.

In the present embodiment, the electrode assembly 110 is shown as having the jelly roll shape. In other implementations, the electrode assembly 110 may have other structures such as a stacked structure in which the separator 113 is interposed between the first electrode plate 111 and the second electrode plate 112.

The can 120 may have a hexahedral shape with an open top surface. The can 120 may be formed of a metal material Such as, for example, aluminum or an aluminum alloy. The can 120 may house the electrode assembly 110, which is immersed in an electrolyte. In order to avoid an undesirable short between the electrode assembly 110 and the can 120 that is formed of the metal material, the electrode assembly 110 may be surrounded by an insulation sheet 170 and may be housed in the can 120. After the electrode assembly 110 is housed in the can 120, the opening OP may be closed by the cap plate 130. A contact between the cap plate 130 and the can 120 may be laser-welded, and thus the internal sealing of the can 120 may be safely maintained.

An electrolyte inlet 131 may be formed in the cap plate 130. After the cap plate 130 and the can 120 are combined, the electrolyte may be injected via the electrolyte inlet 131, and the electrolyte inlet 131 may be closed by a cap 132. In another implementation, the electrolyte inlet 131 may not be formed in the cap plate 130, and the electrolyte may be injected before the cap plate 130 and the can 120 are integrally combined by laser-welding.

An electrode terminal 140 may be mounted in the cap plate 130. An upper part of the electrode terminal 140 may pass through a top surface of the cap plate 130 and may have a top surface exposed to the outside. A lower part of the electrode terminal 140 may pass through a bottom surface of the cap plate 130, and the electrode terminal 140 may have a bottom surface inside the can 120.

The cap plate 130 may be formed of a metal material, similar to that of the can 120. As illustrated in FIG. 3, the electrode terminal 140 may be electrically connected to the first electrode tab 114 of the electrode assembly 110 and may have a first polarity. The cap plate 130 may be electrically connected to the second electrode tab 115 of the electrode assembly 110 and may have a second polarity. The can 120, which is connected to the cap plate 130 by welding, may also have the second polarity.

For example, the cap plate 130 may function as a positive electrode of the secondary battery 100, and the electrode terminal 140 may function as a negative electrode of the secondary battery 100. In this case, in order to prevent a short between the cap plate 130 and the electrode terminal 140, a first gasket 145 and a second gasket 146 that include an insulating material may be arranged between the cap plate 130 and the electrode terminal 140. The first gasket 145 may contact the top surface of the cap plate 130, and the second gasket 146 may contact a bottom surface of the cap plate 130. Referring to FIG. 2, the first gasket 145 and the second gasket 146 may be arranged as separate members. In other implementations, the first gasket 145 and the second gasket 146 may be formed as one body. In order to electrically insulate the can 120, which is welded to the cap plate 130 and thus has the second polarity, from an external object or another secondary battery, an insulating film 160 may be bonded to first and second side surfaces 120s1 and 120s2 of the can 120 and thus may cover the first and second side surfaces 120s1 and 120s2.

A first insulating member 150 may be disposed on the electrode assembly 110 in the can 120 to insulate the electrode assembly 110 from the cap plate 130. In other implementations, the first insulating member 150 may insulate the electrode assembly 110 from the cap plate 130 and may simultaneously prevent the electrode assembly 110 from moving in the can 120. The first insulating member 150 may have through holes through which the first and second electrode tabs 114 and 115 extend toward the opening OP. The first insulating member 150 may also have a hole that corresponds to the electrolyte inlet 131 such that the electrolyte that is injected via the electrolyte inlet 131 passes therethrough. A second insulating member 180 may be arranged at a bottom of the electrode assembly 110 and thus may prevent a short between the electrode assembly 110 and the can 120 formed of the metal material.

As illustrated in FIGS. 1 through 4, the can 120 may have a long axis L and a short axis l. The can 120 may include the opening OP corresponding to the top surface of the can 120, and may include a bottom surface 120b that is located opposite the opening OP. The can may further include the first side surface 120s1, the second side surface 120s2, a third side surface 120s3, and a fourth side surface 120s4 that are disposed between the opening OP and the bottom surface 120b and that are perpendicularly bent or disposed with respect to the bottom surface 120b. The first side surface 120s1 and the second side surface 120s2 may be disposed in parallel so as to correspond to or extend along the short axis l of the can 120 and so as to face each other. The third side surface 120s3 and the fourth side surface 120s4 may be disposed in parallel so as to correspond to or extend along the long axis L of the can 120 and so as to face each other. As illustrated, each of the first side surface 120s1 and the second side surface 120s2 may have a curved shape having a predetermined curvature radius.

In the present embodiment, a first corner 120R1 formed at a contact point between the first side surface 120s1 and the bottom surface 120b, and a second corner 120R2 formed at a contact point between the second side surface 120s2 and the bottom surface 120b may be rounded. The first side surface 120s1 may extend from the rounded first corner 120R1 in a Z-axis direction, the bottom surface 120b may extend the rounded first corner 120R1 in an X-axis direction. Similarly, the second side surface 120s2 may extend from the rounded second corner 120R2 in the Z-axis direction, and the bottom surface 120b may extend from the rounded second corner 120R2 in the X-axis direction.

A third corner 120R3 formed at a contact point between the third side surface 120s3 and the bottom surface 120b, and a fourth corner 120R4 formed at a contact point between the fourth side surface 120s4 and the bottom surface 120b may be rounded. The third side surface 120s3 may extend from the rounded third corner 120R3 in the Z-axis direction, the bottom surface 120b may extend from the rounded third corner 120R3 in the X-axis direction, the fourth side surface 120s4 may extend from the rounded fourth corner 120R4 in the Z-axis direction, and the bottom surface 120b may extend from the rounded fourth corner 120R4 in the X-axis direction.

Hereinafter, a structure of the can 120 will now be described in detail in view of a comparison of a first thickness t1 of each of the first side surface 120s1 and the second side surface 120s2, a second thickness t2 of each of the third side surface 120s3 and the fourth side surface 120s4, and a third thickness t3 of the bottom surface 120b. In this regard, the terms "side surface" and "bottom surface" may be considered as synonymous with terms such as "side wall" and "bottom" of the can such that the side surfaces and bottom surfaces of the can may considered as having a thickness.

Figure 5:
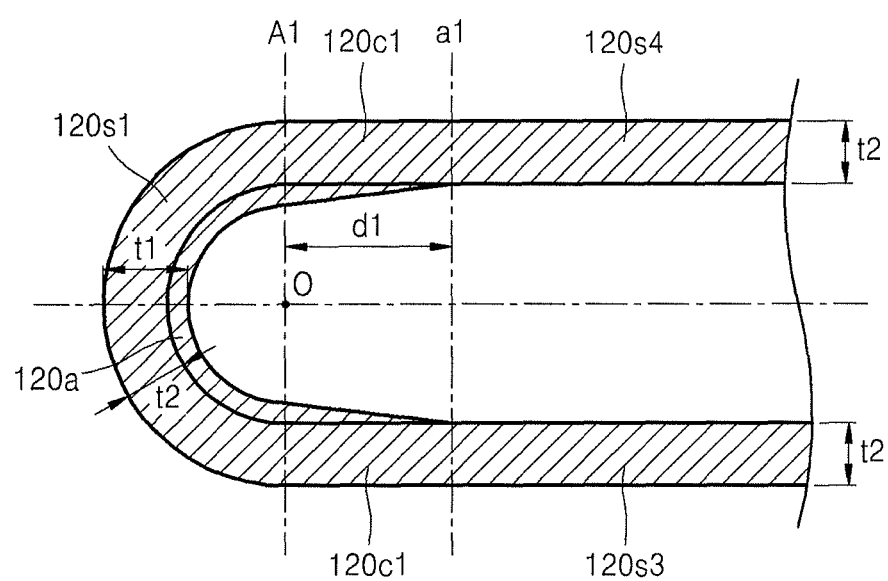
FIG. 5 illustrates a magnified plan view of a portion V of the secondary battery of FIG. 2.

FIG. 5 is a magnified plan view of a portion V of the secondary battery 100 of FIG. 2. The first side surface 120s1 and the second side surface 120s2 are symmetrically formed, and with reference to FIG. 5, it is to be understood that the description relating to the first side surface 120s1 may also be applied to the second side surface 120s2.

Referring to FIG. 5, as described above, the first side surface 120s1 of the can 120 may has the curved shape having the predetermined curvature radius, and thus may has a semicircular shape. That is, as illustrated in FIG. 5, the first side surface 120s1 may be formed to a reference line A1 and may have an angle of 180 degrees with respect to a curvature center O of the first side surface 120s1.

In the present embodiment, the first side surface 120s1 may have the first thickness t1 each of the third side surface 120s3 and the fourth side surface 120s4 connecting with the first side surface 120s1 may have the second thickness t2, and the bottom surface 120b located opposite the opening OP of the can 120 may have the third thickness t3. In this case, the first thickness t1 of the first side surface 120s1 may be greater than the second thickness t2 of the third side surface 120s3 and the fourth side surface 120s4.

As described above, the first thickness t1 of the first side surface 120s1 that corresponds to the short axis l may be greater than the second thickness t2 of each of the third side surface 120s3 and the fourth side surface 120s4 that correspond to the long axis L. Accordingly, although a thickness of the can 120 is not entirely increased, thicknesses of parts where stress is significantly applied may be increased so that a strength of the can 120 against external shocks or internal may be secured.

Also, the can 120 may further have a first connection part 120c1 where the first side surface 120s1 is connected to the third side surface 120s3 and the fourth side surface 120s4. That is, referring to FIG. 5, the first connection part 120c1 may be formed from the reference line A1 that is an end of the first side surface 120s1 to a reference line a1 that is an end of the third side surface 120s3 or the fourth side surface 120s4. A thickness of the first connection part 120c1 may constantly increase or decrease. For example, the thickness of the first connection part 120c1 may increase or decrease in a continuous manner. With respect to the first side surface 120s1, the thickness of the first connection part 120c1 may decrease from the first thickness t1 to the second thickness t2 in a direction from the first side surface 120s1 toward the third side surface 120s3 and the fourth side surface 120s4. Similarly, the thickness of the first connection part 120c1 of the second side surface 120s2 may decrease from the first thickness t1 to the second thickness t2 in a direction from the second side surface 120s2 toward the third side surface 120s3 and the fourth side surface 120s4. The first connection part 120c1 may be formed to have a length d1 of about 5 mm through about 0.2 mm.

Referring to FIGS. 3 and 5, a stepped part 120a may be formed at ends of the first side surface 120s1 and the first connection part 120c1 in a direction toward the opening OP of the can 120. The stepped part 120a may allow the cap plate 130 to be placed inside the opening OP of the can 120 such that the cap plate 130 may seal the opening OP of the can 120. The first side surface 120s1 and the first connection part 120c1 that vertically extend from the bottom surface 120b may extend in a direction toward the opening of the can 120 and may have the first thickness t1 and the thickness that decreases from the first thickness t1 to the second thickness t2. The second thickness t2 of each of the third side surface 120s3 and the fourth side surface 120s4 may extend at an end of the can 120 in a direction toward the opening OP such that a step is formed.

A shape of the second side surface 120s2 that includes the first connection parts 120c1 connected to the third side surface 120s3 and the fourth side surface 120s4 may be symmetrical to a shape of the first side surface 120s1 that includes the first connection parts 120c1 connected to the third side surface 120s3 and the fourth side surface 120s4.

Figure 6:
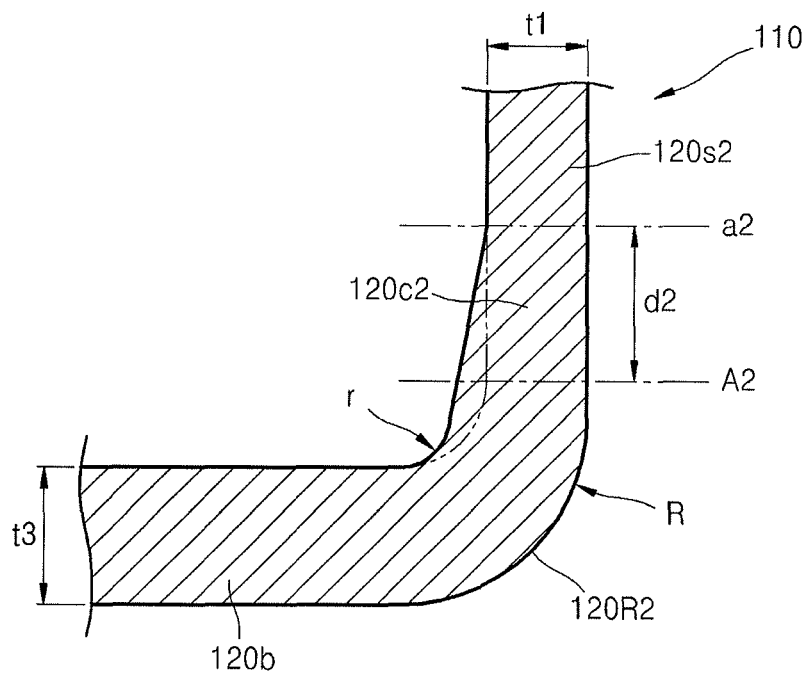
FIG. 6 illustrates a cross-sectional view of a portion VI of the secondary battery of FIG. 3.
Figure 7:
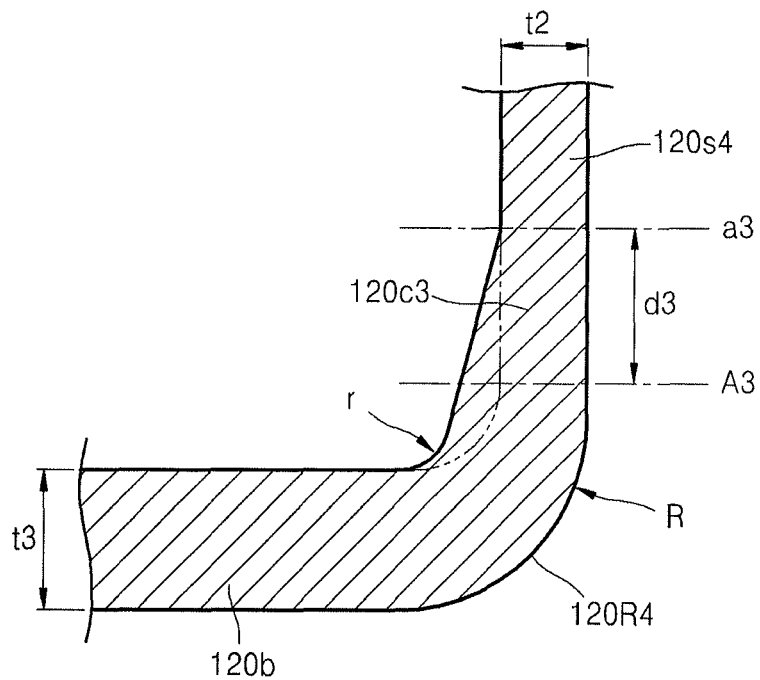
FIG. 7 illustrates a cross-sectional view of a portion VII of the secondary battery of FIG. 4.

FIG. 6 illustrates a cross-sectional view of a portion VI of the secondary battery 100 of FIG. 3, and FIG. 7 illustrates a cross-sectional view of a portion VII of the secondary battery 100 of FIG. 4.

FIG. 6 depicts the bottom surface 120b and the second side surface 120s2 that vertically extends from the bottom surface 120b.

In the present embodiment, the first corner 120R1 formed at the contact point between the first side surface 120s1 and the bottom surface 120b and the second corner 120R2 formed at the contact point between the second side surface 120s2 and the bottom surface 120b may be rounded. The third corner 120R3 formed at the contact point between the third side surface 120s3 and the bottom surface 120b, and the fourth corner 120R4 formed at the contact point between the fourth side surface 120s4 and the bottom surface 120b may also be rounded. In addition, an inner curvature r and an outer curvature R of each of the first through third corners 120R1 through 120R4 where the bottom surface 120b and the first through fourth side surfaces 120s1 through 120s4 are connected may be equal to each other.

Referring to FIG. 6, as described above, the second side surface 120s2 has the first thickness t1 and the bottom surface 120b has the third thickness t3, and in this regard, the third thickness t3 of the bottom surface 120b may be greater than the first thickness t1. From among thicknesses of the surfaces 120s1, 120s2, 120s3, 120s4, and 120b that form the can 120, the thickness of the bottom surface 120b may be the greatest, and the thicknesses of the third side surface 120s3 and the fourth side surface 120s4 that correspond to the long axis L of the can 120 may be the smallest. In this case, the thickness of the bottom surface 120b (i.e., the third thickness t3) may be about 0.55±0.1 mm, the thickness of each of the first side surface 120s1 and the second side surface 120s2 (i.e., the first thickness t1) may be about 0.38±0.1 mm, and the thickness of each of the third side surface 120s3 and the fourth side surface 120s4 (i.e., the second thickness t2) may be about 0.25±0.1 mm.

The can 120 further includes the second connection part 120c2 where the bottom surface 120b is connected to the first side surface 120s1 and the second side surface 120s2. Referring to FIG. 6, the second connection part 120c2 may be formed from a reference line A2 that is an end of the bottom surface 120b to a reference line a2 that is an end of the first side surface 120s1 or the second side surface 120s2. A thickness of the second connection part 120c2 may increase or decrease in a constant or continuous manner. The thickness of the second connection part 120c2 may decrease from the third thickness t3 to the first thickness t1 in a direction from the bottom surface 120b toward the first side surface 120s1 and the second side surface 120s2. The second connection part 120c2 may be formed to have a length d2 of about 2 mm through about 0.2 mm.

FIG. 7 illustrates the bottom surface 120b and the fourth side surface 120s4 that vertically extends from the bottom surface 120b.

As described above, the first corner 120R1 formed at the contact between the first side surface 120s1 and the bottom surface 120b, and the second corner 120R2 formed at the contact between the second side surface 120s2 and the bottom surface 120b may be rounded. Also, the third corner 120R3 formed at the contact between the third side surface 120s3 and the bottom surface 120b, and the fourth corner 120R4 formed at the contact between the fourth side surface 120s4 and the bottom surface 120b may be rounded. In addition, an inner curvature r and an outer curvature R of each of the first through third corners 120R1 through 120R4 where the bottom surface 120b and the first through fourth side surfaces 120s1 through 120s4 are connected may be equal to each other.

Referring to FIG. 7, as described above, the fourth side surface 120s4 has the second thickness t2 and the bottom surface 120b has the third thickness t3, and in this regard, the third thickness t3 of the bottom surface 120b may be greater than the second thickness t2. From among thicknesses of the surfaces 120s1, 120s2, 120s3, 120s4, and 120b that form the can 120, the thickness of the bottom surface 120b may be the greatest, and the thicknesses of the third side surface 120s3 and the fourth side surface 120s4 that correspond to the long axis L of the can 120 may be the smallest.

The can 120 may further includes a third connection part 120c3 where the bottom surface 120b is connected to the third side surface 120s3 and the fourth side surface 120s4. Referring to FIG. 7, the third connection part 120c3 may be formed from a reference line A3 that is an end of the bottom surface 120b to a reference line a3 that is an end of the third side surface 120s3 or the fourth side surface 120s4. A thickness of the third connection part 120c3 may increase or decrease in a constant or continuous manner. In more detail, the thickness of the third connection part 120c3 may decrease from the third thickness t3 to the second thickness t2 in a direction from the bottom surface 120b toward the third side surface 120s3 and the fourth side surface 120s4. The third connection part 120c3 may be formed to have a length d3 of about 2 mm through about 0.2 mm.

As described above, each of the surfaces 120s1, 120s2, 120s3, 120s4, and 120b of the can 120 may have one of the first through third thicknesses t1 through t3, and the first through third connection parts 120c1 through 120c3 of which thicknesses increase or decrease in a constant or continuous manner may be arranged at connections between the surfaces 120s1, 120s2, 120s3, 120s4, and 120b. Accordingly, although the thickness of the can 120 does not entirely increase, thicknesses of parts where stress is significantly applied may be increased such that a strength of the can 120 against external shocks or internal may be secured.

By way of summation and review, a reliability test for secondary batteries may be performed according to the environment of use. Examples of representative test items include durability according to temperatures, drop strength, prevention of electrostatic discharge (ESD), charging and discharging, or the like.

From among the test items, the drop strength test evaluates not only the mechanical properties of the secondary battery but also the operations thereof. For example, when the secondary battery is dropped or a strong shock is applied from an external source to the secondary battery, the secondary battery may be damaged, an electric short may occur or an electrolyte may leak. In this case, the secondary battery may not normally operate.

As described above, one or more of the above embodiments provide a secondary battery that has high resistance against the external shock and internal swelling.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. A secondary battery, comprising:
an electrode assembly including a first electrode plate, a second electrode plate, and a separator between the first electrode plate and the second electrode plate;
a can housing the electrode assembly, the can having a long axis and a short axis, and an opening at a side thereof through which the electrode assembly is inserted; and
a cap plate that seals the opening of the can,
wherein the can includes:
a first side surface and a second side surface that face each other and extend in a first direction of the short axis of the can, the first side surface and the second side surface each having a first thickness in a second direction of the long axis of the can,
a third side surface and a fourth side surface that face each other and extend along the second direction of the long axis of the can, the third side surface and the fourth side surface each having a second thickness, the first thickness being greater than the second thickness in the first direction, and
a bottom surface that is located opposite the opening of the can and contacts the first through fourth side surfaces, the bottom surface having a third thickness in a third direction perpendicular to the first direction and the second direction, the first direction, the second direction, and the third direction being orthogonal to each other, wherein the third thickness of the bottom surface is greater than either of the first thickness and the second thickness, wherein:

the can further includes a second connection part where the bottom surface is connected to the first side surface and the second side surface, and a third connection part where the bottom surface is connected to the third side surface and the fourth side surface, and a thickness of the second connection part and a thickness of the third connection part increase or decrease in a continuous manner in the third direction, and wherein:

the thickness of the second connection part and the thickness of the third connection part are straightly tapered in an inner side of the can along the short and long axes, respectively, in the third direction.

2. The secondary battery as claimed in claim 1, wherein:
the can further includes a first connection part where the first side surface or the second side surface is connected to the third side surface and the fourth side surface, and
a thickness of the first connection part increases or decreases in a continuous manner.

3. The secondary battery as claimed in claim 2, wherein the thickness of the first connection part decreases from the first thickness to the second thickness in a direction from the first side surface or the second side surface toward the third side surface or the fourth side surface.

4. The secondary battery as claimed in claim 3, wherein each of the first side surface and the second side surface has a semicircle shape having a predetermined curvature radius.

5. The secondary battery as claimed in claim 1, wherein the thickness of the second connection part decreases from the third thickness to the first thickness in a direction from the bottom surface toward the first side surface and the second side surface.

6. The secondary battery as claimed in claim 1, wherein the thickness of the third connection part decreases from the third thickness to the second thickness in a direction from the bottom surface toward the third side surface and the fourth side surface.

7. The secondary battery as claimed in claim 6, wherein:
corners formed at contact points between the bottom surface and the first through fourth side surfaces are rounded, and
an inner curvature and an outer curvature of each of the corners are equal to each other.

8. The secondary battery as claimed in claim 7, wherein:
the first thickness is about 0.38±0.1 mm,
the second thickness is about 0.25±0.1 mm, and
the third thickness is about 0.55±0.1 mm.

9. A can for a secondary battery, the can comprising:
a first side surface and a second side surface that face each other and extend along a first direction of a short axis of the can, the first side surface and the second side surface having a first thickness in a second direction;
a third side surface and a fourth side surface that face each other and extend along the first direction of a long axis of the can, the third side surface and the fourth side surface having a second thickness in the first direction;
a bottom surface that has a third thickness, the bottom surface contacting the first through fourth side surfaces in a third direction perpendicular to the first direction and the second direction;
a first connection part where the first side surface or the second side surface is connected to the third side surface and the fourth side surface;
a second connection part where the bottom surface is connected to the first side surface and the second side surface; and
a third connection part where the bottom surface is connected to the third side surface and the fourth side surface, wherein:
the third thickness is greatest,
the second thickness is smallest, and
a thickness of the second connection part decreases or increases in a continuous manner in the third direction, and wherein
the thickness of the second connection part and the thickness of the third connection part are straightly tapered in an inner side of the can along the short and long axes, respectively, in the third direction.

* * * * *